UNITED STATES PATENT OFFICE.

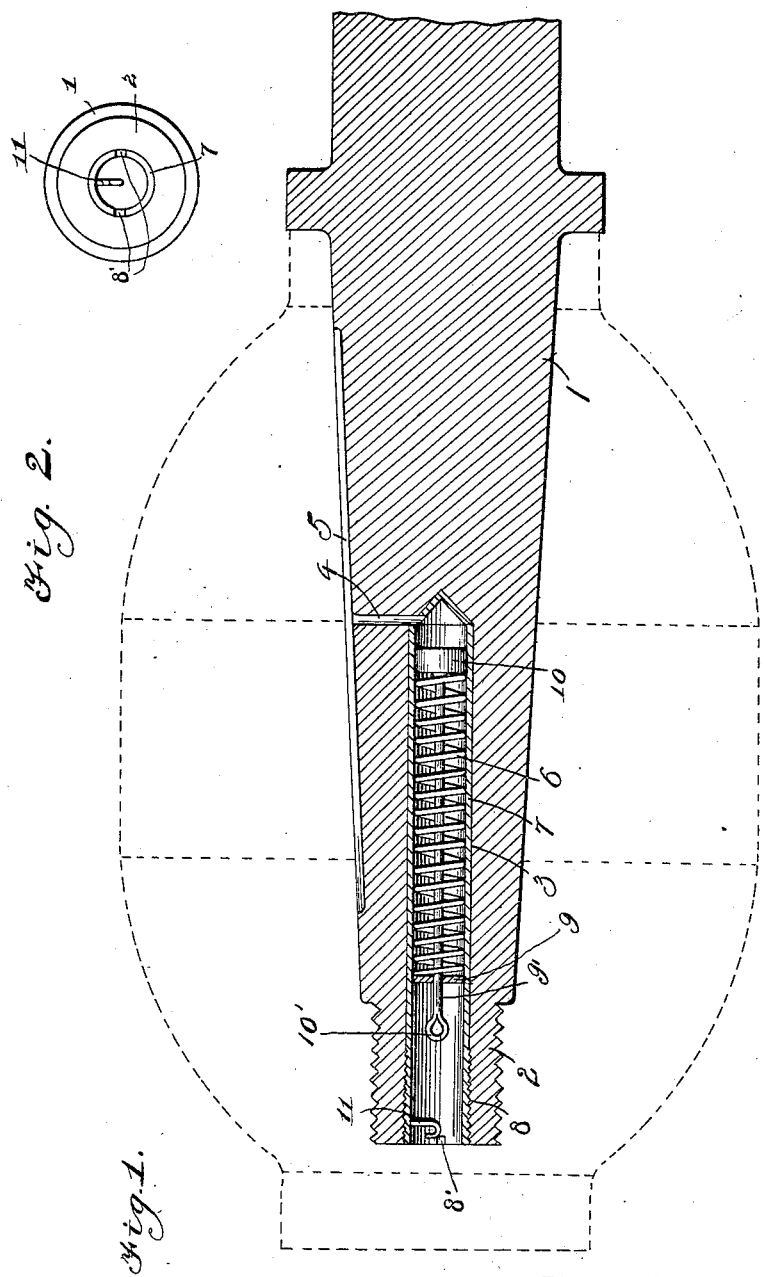

HUGH T. CLARK, OF VALLEJO, CALIFORNIA.

LUBRICATOR.

1,065,219.   Specification of Letters Patent.   Patented June 17, 1913.

Application filed September 16, 1911. Serial No. 649,644.

*To all whom it may concern:*

Be it known that I, HUGH T. CLARK, a citizen of the United States, residing at Vallejo, in the county of Solano and State of California, have invented new and useful Improvements in Lubricators, of which the following is a specification.

This invention relates to improvements in axles, shafts and the like.

The primary object of the invention is to provide a vehicle axle or the like with simple, novel and effective means for forcing a lubricant upon the hub of the wheel engaging the said axle.

In carrying out my invention, I contemplate the employment of an ordinary axle or the like, the same being centrally provided with a bore or chamber, the said chamber having a port or opening communicating with an elongated groove formed upon the axle proper, the said bore being adapted to receive a lubricant, and resilient means removably secured within the bore for forcing the lubricant through the port and into the groove for lubricating the axle and the hub of the wheel mounted upon the axle.

For a more detailed description of the invention, and the advantages thereof, reference is to be had to the accompanying drawings, in which,—

Figure 1 is a central longitudinal sectional view of an axle constructed in accordance with the present invention, the hub and boxing being indicated by the dotted lines. Fig. 2 is a front elevation of the same.

Referring now to the drawings in detail, the numeral 1 designates an axle, the same being of any preferred or desired construction and the said axle has its outer extremity formed with the usual reduced threaded portion for the reception of a nut whereby the axle is sustained upon the hub of the wheel. The axle 1 is centrally drilled to provide a longitudinally extending recess or bore 3, the same extending from the face of the axle any desired distance, and the said bore communicates adjacent its inner wall with a port 4, the said port communicating with a groove 5 which is arranged longitudinally of the axle and which extends a suitable distance beyond both sides of the port 4.

The numeral 7 designates a tube which is secured within the bore 3, in any desired or preferred manner, the bore and tube, in the present showing, being provided with threads 8, and the tube having oppositely arranged depressions 8' for the reception of a screw driver or other similar device, whereby the said tube may be screwed within the bore or removed therefrom as occasion requires. The tube is open at both of its ends, and is provided with a partition 9 through which extends a stem 9' which carries a piston 10. The numeral 6 designates a spring which surrounds the stem and exerts pressure between the partition 9 and the piston 10, so as to normally force the said piston toward the port 4 of the axle. The stem 9' has its extremity, that is the portion projecting through the partition formed with an eye 10', while the outer end of the tube is interiorly provided with a hook 11, the said hook being adapted to engage with the eye 10' when the piston 10 is retracted against the pressure of the spring 6, and in order to sustain the said piston in this position, so that upon withdrawal of the tube 7 a lubricant can be fed within the tube and upon the piston. After the tube is inserted within the bore the eye 10' is released from the hook 11, and the spring 6 exerting pressure upon the piston will cause the said piston to force the lubricant through the port 4 and within the groove 5, from whence it is delivered to the boxing of the hub.

Having thus described the invention, what I claim is:—

In combination with an axle having a central bore, a tubular casing in said bore, the said axle having a port communicating with the casing and with the outer face of the axle, a partition within the casing, a stem passing through the partition and having one of its ends provided with an eye, the opposite end of the stem being provided with a piston, a spring surrounding the stem and adapted to exert pressure between the partition and the piston, and a substantially J-shaped hook within the casing, the said eye on the stem, being adapted to be passed over the curved portion of the J-shaped hook and retained in the pocket formed thereby, so that said stem may be held against the tension of the spring.

In testimony whereof I affix my signature in presence of two witnesses.

HUGH T. CLARK.

Witnesses:
C. WOLFF,
THOMAS MCDOWELL.

Copies of this patent may be obtained for five cents each, by addressing the "Commissioner of Patents, Washington, D. C."